Figure 1:
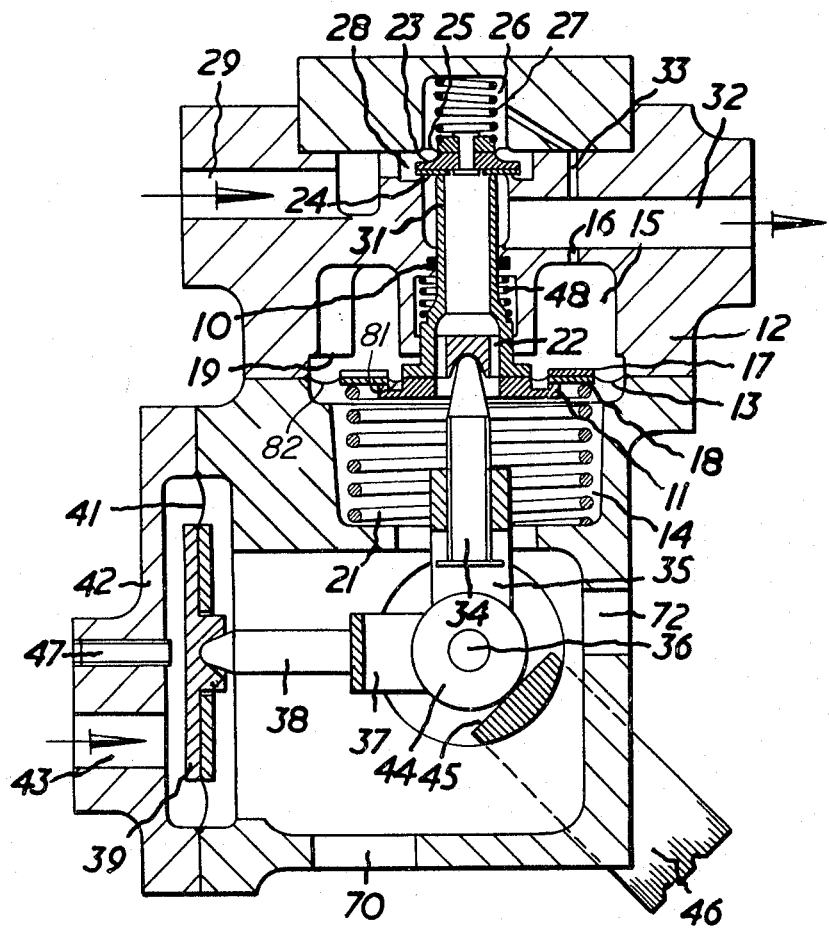

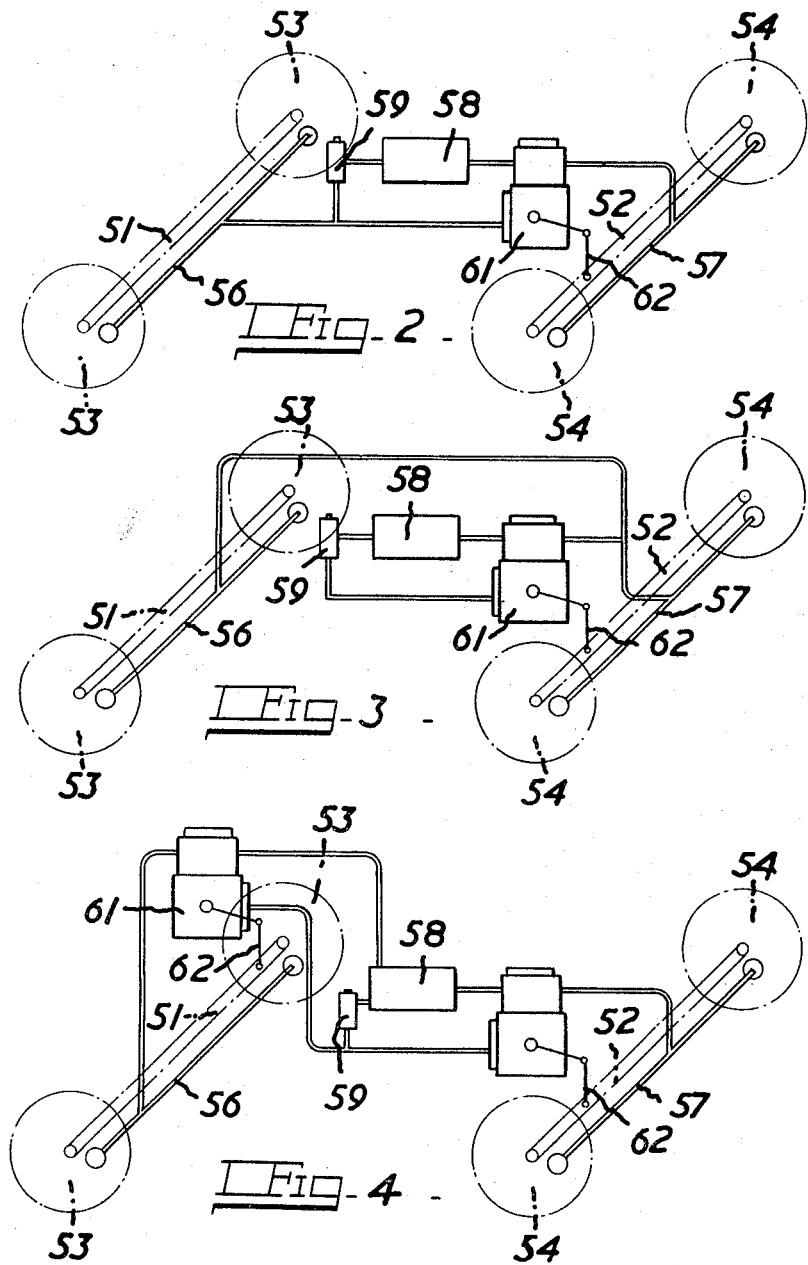

United States Patent Office

3,304,129
Patented Feb. 14, 1967

3,304,129
LOAD ADJUSTED BRAKE CONTROL MEANS
FOR VEHICLES
Alexander John Wilson, Sutton Coldfield, England, assignor to Girling Limited, Birmingham, England, a British company
Filed Dec. 30, 1964, Ser. No. 422,186
Claims priority, application Great Britain, Dec. 31, 1963, 51,292/63
7 Claims. (Cl. 303—6)

This invention relates to improvements in brake cotrol means for vehicles.

The braking effort which can be developed at a road wheel of a vehicle before skidding occurs is partly dependent on the wheel loading. In vehicles for carrying passengers or goods, the wheel loading may vary within wide limits and the distribution of the total load between the various wheels may also vary so that it is difficult to provide a braking system which will provide braking approaching the optimum on different wheels under different conditions of loading.

The design of a braking system therefore is usually a compromise, and under some conditions one or more wheels of a vehicle may skid while the brakes on other wheels are not fully loaded. This is particularly the case with goods vehicles where the variation in the wheel loading between empty and laden conditions may be very substantial.

In the specification of out British Patent No. 917,494 we have described and claimed means for controlling the pressure of fluid supplied to a fluid pressure actuator or actuators for the brake or brakes on one or more wheels of a vehicle, comprising a valve system incorporating a movable valve element adapted to be moved in one direction by fluid pressure acting on a member co-operating with an inclined plane of which the angle can be varied, the valve element being movable in the other direction by the application to the valve element or to a part associated with it of fluid under another pressure which will normally be that applied to the actuator or actuators.

The variation in the angle of the inclined plane may be effected manually in accordance with the loading on the wheel or wheels or it may be effected automatically, as for example by coupling it to the suspension of an axle of the vehicle.

One of the objects of our present invention is to provide a brake control means in which the torque output of the brakes is proportional to a signal pressure as modified in accordance with the loading of the braked wheels and in which the application and release of the brakes are effected with a minimum time delay.

According to our present invention brake control means comprises a valve assembly controllable by a member actuable by signal pressure and acting through an inclined plane of which the inclination is variable, the valve assembly being associated with pressur-sensitive means exposed to the braking pressure when the brake is applied and being also associated with resilient means which bias the pressure-sensitive means in opposition to the force resulting from the braking pressure.

In the accompanying drawings:

FIGURE 1 is a section of one form of control means in accordance with our invention, the various members of the asembly being shown in the positions they assume when a controlled pressure is being maintained in the brake line or lines; and FIGURES 2, 3 and 4 are diagrammatic views of various braking layouts incorporating our improved control means.

In the control means shown in FIGURE 1 a hollow valve element has a stem 10 on the lower end of which is a head 11. The stem is slidably mounted in a bore in a body 12. The valve element is associated with pressure-sensitive means in the form of a flexible diaphragm 13 which is secured at its inner edge to the stem 10 and at its outer edge is clamped between two parts of the body. The diaphragm 13 divides the body 12 into a lower chamber 14 which houses the control mechanism and an upper chamber 15 which is annular and is closed except for a port 16 connecting it to the output side of the valve. An annular portion of the diaphragm 13 is clamped between two metal rings 17, 18 forming abutment means and the portion 81 of the diaphragm between the rings and the stem of the valve element permits a limited relative axial movement between the valve element and the rings 17, 18. The outer portion 82 of the diaphragm permits limited movement of the rings 17, 18 relative to the body 12. Upward movement of the diaphragm is limited by the engagement of the upper ring 17 with a stop in the form of three internal shoulders 19 in the body (only one is visible on FIGURE 1) and downward movement of the diaphragm relative to the valve element is limited by the engagement of the lower ring 18 with another stop in the form of the head 11 of the valve element. Resilient means in the form of a spring 21 bear on the lower ring 18 to bias the diaphragm upwardly.

The hollow stem 10 of the valve element communicates through axial ports 22 in the head 11 with the chamber 14 and from there with atmosphere through openings 70 and 72 in that chamber. The upper end of the stem 10 co-operates with a washered valve head 23 normally held in engagement with an annular seating 24 in the body concentric with the stem which is reduced in diameter adjacent to its upper end. The valve head is supported by a diaphragm 25 closing the lower end of a small chamber 26 above the valve head, a light spring 27 in this chamber urging the valve head downwardly into engagement with the seating 24. An annular space 28 between the diaphragm 25 and the seating 24 is in communication with an inlet passage 29 to which fluid under pressure is supplied from a source such as a reservoir or accumulator.

An annular space 31 around the valve stem 10 below the seating 24 is in communication with an outlet passage 32 leading to the slave cylinders of the brakes to be actuated. The passage 32 is in communication through the port 16 with the chamber 15 as described above and through a port 33 with the small chamber 26 above the valve head. Thus the upper surfaces of the diaphragm 13 and 25 are both exposed to the outlet pressure when the brake is applied.

In the "brakes off" position the valve head 23 is in engagement with its seating 24 and the upper end of the stem 10 of the valve element is spaced from the underside of the valve head. The supply or inlet pressure acts upwardly on the underside of the upper diaphragm 25 and downwardly on the upper side of the valve head 23, and the respective areas are such that there is a slight resultant downward force to hold the valve head in engagement with its seating. The brake line is open to atmosphere through the stem 10, the chamber 14 and the openings 70 and 72.

The biasing spring 21 exerts an upward force on the diaphragm 13 which is taken by the engagement of the upper ring 17 on the diaphragm with the shoulder 19 in the body.

Control of the valve element is effected by a movable finger 34 adjustably screwed into a fork or yoke 35 pivotally mounted on a floating spindle 36 located in the lower end of the body, the upper end of the finger being in rocking engagement with an axial recess in the lower end of the valve element. A fork or yoke 37 also pivotally mounted on the spindle 36 carries a finger 38 of which the outer end is in rocking engagement with a disc 39 mounted in the centre of a diaphragm 41 of which the outer edge is clamped between the valve body and a cover plate 42. An inlet 43 conveys to the space between the cover plate and the diaphragm fluid at a signal pressure determined by a pedal-operated valve or other means under the control of the driver of the vehicle. A roller 44 mounted on the spindle 36 is in rolling engagement with an inclined plane surface 45 which is angularly movable about the axis of the spindle by a lever arm 46 coupled to a part of an axle suspension or other part sensitive to the axle loading.

An adjustable stop 47 is screwed through the cover plate 42 to limit the movement of the disc 39 towards the cover plate.

The effective leverage ratio between the force applied to the diaphragm by the incoming controlled fluid pressure and the force applied to the valve element depends on the inclination of the plane surface 45 which in turn depends on the vehicle loading.

In an alternative construction, the angle of the surface 45 is adjustable manually for example between an "unladen" position, a "half-laden" position and a "fully-laden" position.

When a signal pressure is applied to the diaphragm 41 it exerts an upward force through the finger 34 on the valve element, the leverage through which the applied pressure acts being dependent on the inclination of the plane surface 45. The valve element is moved upwardly until the upper end of the stem 10 engages the valve head 25 and cuts off from atmosphere the outlet passage and the chambers 26 and 15. On an increase in the signal pressure the valve element is raised to lift the valve head 25 off its seating and allow pressure fluid to flow to the outlet 32 and so to the brakes. At the same time the pressure applied to the brakes is admitted to the chamber 26 where it acts downwardly on the diaphragm 25 and to the chamber 15 where it acts downwardly on the diaphragm 13 which moves downwardly against the spring 21 until the lower ring 18 engages the head 11 of the valve element. Further increase in pressure acting over the whole diaphragm and exerting a downward force on the valve element in opposition to the upward force exerted by the signal pressure moves the valve element downwardly to allow the head 23 to close onto its seating to prevent further flow of fluid to the brakes.

The bias spring 21 thus increases the output pressure over and above that due to the signal pressure alone by an amount which can be such as substantially to overcome any force opposing motion of the brake shoes or pads to the brake surfaces, for example, the spring can be such as to increase the output pressure enough to overcome the shoe return springs.

When the signal pressure is relieved to release the brakes the valve element moves downwardly so that the upper end of the stem 10 moves away from the valve head 23 and pressure fluid from the lines to the brakes can flow to exhaust through the hollow valve element. As the pressure in the brake line diminishes the downward force exerted on the diaphragm 13 is reduced and ultimately becomes less than the upward force exerted by the biasing spring 21. The diaphragm moves upwardly until the upper ring 17 on the diaphragm engages the shoulder 19 in the body. The valve element is maintained in its exhausting position by a spring 48 acting in a downward direction on the valve element until the evacuation of the brake line is completed.

In a modification the diaphragm 13 may be replaced by an annular piston in sliding engagement with the valve member and with a concentric cylindrical surface in the lower part of the chamber 15, the piston having a limited axial movement relative to the valve member and co-operating with a shoulder or other stop in the valve body which limits the upward movement of the piston under the influence of the biasing spring 21.

Some applications of our improved control means to braking systems are illustrated in FIGURES 2, 3 and 4 of the drawings.

In each of these drawings 51 and 52 are axles of a vehicle carrying wheels 53 and 54 provided with fluid pressure brakes to which fluid under pressure is supplied through pipe lines 56 and 57.

Each system incorporates a reservoir 58 containing fluid under pressure, a pedal-operated valve 59 and at least one control means 61 as described above.

In the system shown in FIGURE 2 fluid under pressure is supplied directly from the valve 59 to the pipe line 56 leading to the brakes of the wheels on the axle 53. Fluid under pressure is supplied to the pipe line 57 leading to the brakes of the wheels on the axle 52 through the control means 61, the pressure supplied to the brakes being determined by the signal pressure provided by the valve 59 and the inclination of the inclined plane in the control means which is coupled to the axle by a link 62.

In the system shown in FIGURE 3 the pressure of the fluid supplied to the brakes of the wheels on both axles is controlled by a single control means 61 in accordance with the loading on the axle 52, the output from the control means being supplied through a pipe line 63 to both pipe lines 56 and 57. With this arrangement a given rate of deceleration can be produced by the same pedal effort substantially independently of the gross weight of the vehicle.

Preferably the connection between the axle and the lever which controls the inclination of the plane surface in the control mechanism incorporates an over-travel device including a spring which yields at a value such that no further angular movement of the levers takes place after the brakes have been applied and the control is not sensitive to load transfer between the axles due to inertia forces, the control only being sensitive to changes in static loading.

In the system shown in FIGURE 4 there is a separate control means 61 for each axle, the pressure of the fluid supplied to the brakes on the wheels on each axle being controlled independently in accordance with the loading on the axle to apportion the total braking effort in proportion to the axle loading.

In this case over-travel devices incorporated in the connections between the axles and the levers controlling the inclinations of the plane surfaces in the control mechanism include springs of sufficient strength to allow the inclination to be varied while the brakes are applied so that the control is sensitive to weight transfer due to inertia forces.

Advantages of our improved brake operating means are that it allows a higher pressure to be applied to the brakes for a given input pressure and that it prevents fluid under pressure from being trapped in the line leading to the brakes.

A further advantage is that for any given signal pressure the pressure applied to the brakes is accurately dependent on the angle of the inclined plane through which the signal pressure acts, and hence on the loading of the braked wheels or axle. Thus a range of signal pressures produces a range of braking efforts varied in accordance with axle loading, the braking effort varying with pedal load and axle load.

The reservoir or accumulator providing the input pressure can be located close to the brakes while the signal pressure is obtained from the same reservoir or accumulator through a line of any required length under the control of a treadle valve.

I claim:
1. Brake control means comprising:
   a housing;

an inlet and an outlet for fluid in said housing;
a valve assembly actuable to control fluid flow between said inlet and outlet;
pressure-responsive means within said housing comprising first and second relatively movable parts actuable, in response to the pressure of outlet fluid, to exert a first and second force on said valve assembly;
variable mechanical advantage mechanism;
means operable to vary the mechanical advantage of said mechanism in accordance with changes in the loading on a vehicle axle;
a member actuable by signal pressure to exert on said valve assembly a third force in opposition to said first and second forces, said third force acting through said variable mechanical advantage mechanism;
abutment means;
and resilient means biasing said second part of said pressure-responsive means in opposition to said outlet pressure towards a first configuration in engagement with said abutment means in which only said first part of said pressure-responsive means acts on said valve assembly, said resilient means being yieldable to allow said second part of said pressure-responsive means to move to a second configuration in which said second part of said pressure-responsive means acts on said valve assembly.

2. Brake control means comprising:
a housing;
an inlet and outlet for fluid in said housing;
a valve assembly actuable to control fluid flow between said inlet and outlet;
pressure-responsive means comprising first and second relatively movable diaphragm means within said housing actuable in response to the pressure of outlet fluid to exert a first and second force on said valve assembly, said first diaphragm means being connected between said valve assembly and an abutment plate engageable with a stop on said valve assembly, and said second diaphragm means being connected between said abutment plate and said housing;
variable mechanical advantage mechanism;
means operable to vary the mechanical advantage of said mechanism in accordance with changes in the loading on a vehicle axle;
a member connected to said variable mechanical advantage mechanism actuable by signal pressure to exert on said valve assembly a third force in opposition to said first and second force;
abutment means engageable by said abutment plate;
and resilient means biasing said pressure-responsive means in opposition to said outlet pressure towards a first configuration in which said abutment plate engages said abutment means and in which only said first diaphragm means acts on said valve assembly, said resilient means being yieldable to allow said pressure-responsive means to move to a second configuration in which said abutment plate engages said stop on said valve assembly and in which said second diaphragm means acts on said valve assembly through said abutment plate and said stop.

3. Brake control means as claimed in claim 1, wherein said variable mechanical advantage mechanism comprises an inclined plane and wherein said means operable to vary the mechanical advantage of said mechanism is actuable to change the angle of said inclined plane.

4. Brake control means as claimed in claim 2, wherein said variable mechanical advantage mechanism comprises an inclined plane, and wherein said means operable to vary the mechanical advantage of said mechanism is actuable to change the angle of said inclined plane.

5. Brake control means as claimed in claim 1, wherein said valve assembly includes a balanced valve.

6. Brake control means as claimed in claim 2, wherein said valve assembly includes a balanced valve.

7. Brake control means as claimed in claim 5, wherein said balanced valve comprises a seating, a valve head engageable with said seating, a spring urging said valve head towards said seating, a diaphragm connected between said valve head and said housing and subjected on one side in use to pressure of inlet fluid in opposition to said spring, the diaphragm in use being subjected on its opposite side to outlet fluid pressure.

References Cited by the Examiner

UNITED STATES PATENTS

| 2,657,774 | 11/1953 | Perrot | 188—152.11 X |
| 2,998,284 | 8/1961 | Kirk | 303—40 X |
| 3,084,002 | 4/1963 | Peras | 303—22 |
| 3,109,681 | 11/1963 | Wilson | 303—60 X |

FOREIGN PATENTS

| 839,676 | 1960 | Great Britain. |

EUGENE G. BOTZ, *Primary Examiner.*